(12) United States Patent
Hong et al.

(10) Patent No.: US 9,113,172 B2
(45) Date of Patent: Aug. 18, 2015

(54) TECHNIQUES FOR DESCRIBING TEMPORAL CODING STRUCTURE

(75) Inventors: Danny Hong, New York, NY (US); Jill Boyce, Manalapan, NJ (US)

(73) Assignee: Vidyo, Inc., Hackensack, NJ (US)

( * ) Notice: Subject to any disclaimer, the term of this patent is extended or adjusted under 35 U.S.C. 154(b) by 464 days.

(21) Appl. No.: 13/350,239

(22) Filed: Jan. 13, 2012

(65) Prior Publication Data

US 2012/0183060 A1 Jul. 19, 2012

Related U.S. Application Data

(60) Provisional application No. 61/432,860, filed on Jan. 14, 2011, provisional application No. 61/432,842, filed on Jan. 14, 2011.

(51) Int. Cl.
| | |
|---|---|
| *H04N 19/18* | (2014.01) |
| *H04N 19/54* | (2014.01) |
| *H04N 19/58* | (2014.01) |
| *H04N 19/70* | (2014.01) |
| *H04N 19/61* | (2014.01) |
| *H04N 19/31* | (2014.01) |
| *H04N 19/436* | (2014.01) |
| *H04N 19/40* | (2014.01) |
| *H04N 19/573* | (2014.01) |

(52) U.S. Cl.
CPC ............. *H04N 19/58* (2014.11); *H04N 19/18* (2014.11); *H04N 19/31* (2014.11); *H04N 19/40* (2014.11); *H04N 19/436* (2014.11); *H04N 19/54* (2014.11); *H04N 19/573* (2014.11); *H04N 19/61* (2014.11); *H04N 19/70* (2014.11)

(58) Field of Classification Search
CPC ................... H04N 19/00054; H04N 19/00018
See application file for complete search history.

(56) References Cited

U.S. PATENT DOCUMENTS

| | | | |
|---|---|---|---|
| 7,505,590 B1 * | 3/2009 | Apostolopoulos | ............ 380/210 |
| 2008/0253467 A1 | 10/2008 | Wang et al. | |
| 2009/0003439 A1 | 1/2009 | Wang et al. | |
| 2009/0116562 A1 | 5/2009 | Eleftheriadis et al. | |
| 2010/0098154 A1 | 4/2010 | Lou et al. | |

FOREIGN PATENT DOCUMENTS

| | | |
|---|---|---|
| WO | WO 2007/042914 | 4/2007 |
| WO | WO 2007/042916 | 4/2007 |
| WO | WO 2008/048886 | 4/2008 |

OTHER PUBLICATIONS

International Search Report and Written Opinion for PCT/US2012/020158, dated Mar. 21, 20102.
U.S. Appl. No. 13/343,266, filed Jan. 4, 2012.
(Continued)

*Primary Examiner* — Joseph Ustaris
*Assistant Examiner* — Mikhail Itskovich
(74) *Attorney, Agent, or Firm* — Baker Botts, LLP

(57) ABSTRACT

The disclosed subject matter describes a new pattern description that can be part of an SEI message or a parameter set, and can be used to describe a temporal picture coding structure and associated bitrates and frame rates. The knowledge of the coding structure can benefit transraters, bitstream extractors, and digital video recorders. Decoders can utilize the coding structure information for example, to decode pictures in parallel, using multiple threads/cores.

13 Claims, 6 Drawing Sheets

(56) References Cited

OTHER PUBLICATIONS

"Advanced video coding for generic audiovisual services", Mar. 2010, available from ther International Telecommunication Union ("ITU"), Place de Nations, CH-1211 Geneva 20, Switzerland or http://www.itu.int/rec/T-REC-H.264.

"Information technology—Generic coding of moving pictures and associated audio information", Feb. 2000, available from http://www.itu.int/rec/T-REC-H.262.

Tuorapis et al., "H.264/14496-10 AVC Reference Software Manual", (revised for JM17.1) JVT-AE010 revised, JVT-Manaul, London, UK, Jun. 2000, available from http://wftp.itu.int/av-arch/jvt-site/2009_06_London/JVT-AE010.zip.

Bross et al., "WD4: working Draft 4 of High-Efficiency Video Coding", available from http://wftp3.itu.int/av-arch/jctvc-site/2011_07_F_Torino, Jul. 2000.

Eleftheriadis, "Clarification on the Temporal Nesting of Temporal Levels", Joint Video Team (JVT) of ISO/IEC MPEG & ITU-T VCEG (JVT-U085), 6 pages, 21$^{st}$ Meeting: Hangzhou, China, Oct. 20-27, 2006.

Wang et al., "SVC Temporal Layer Switching Points", Joint Video Team (JVT) of ISO/IEC MPEG & ITU-T VCEG (JVT-X032r2) 4 pages, 24$^{th}$ Meeting: Geneva, CH, Jun. 29-Jul. 5, 2007.

U.S. Appl. No. 13/343,266, filed on Jan. 4, 2012.

JP Notice of Allowance dated Apr. 20, 2015 in JP Patent Application No. 2013-549439.

* cited by examiner

FIG. 2
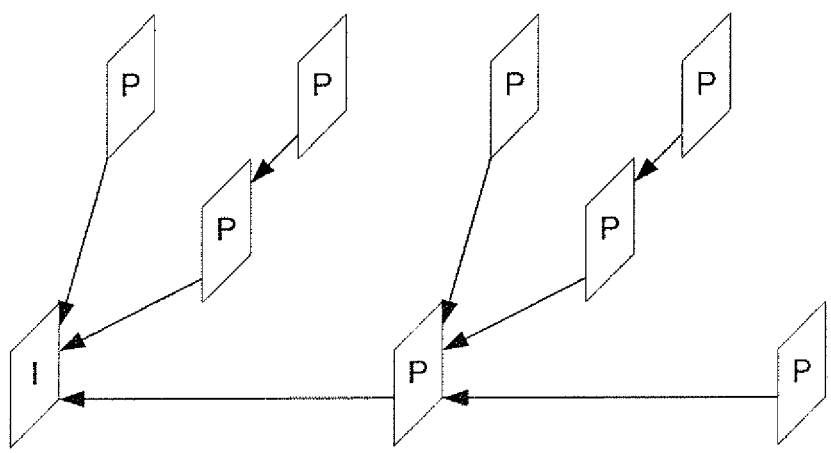
201
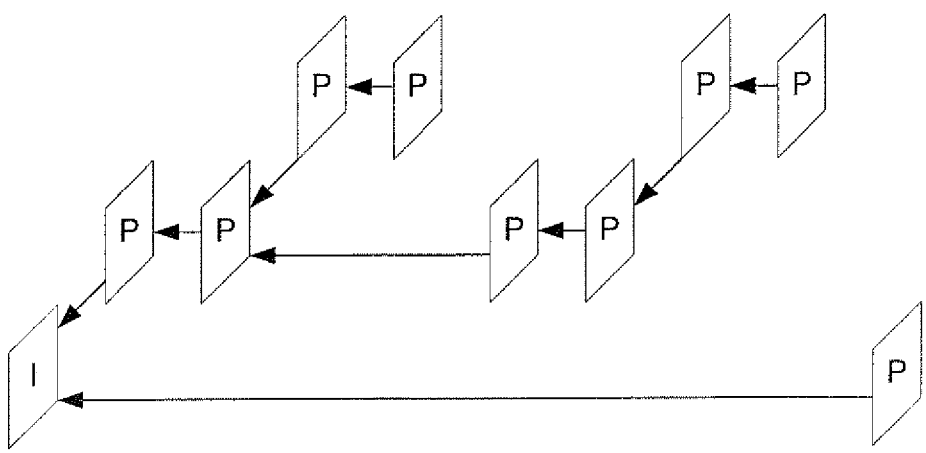
202

FIG. 3
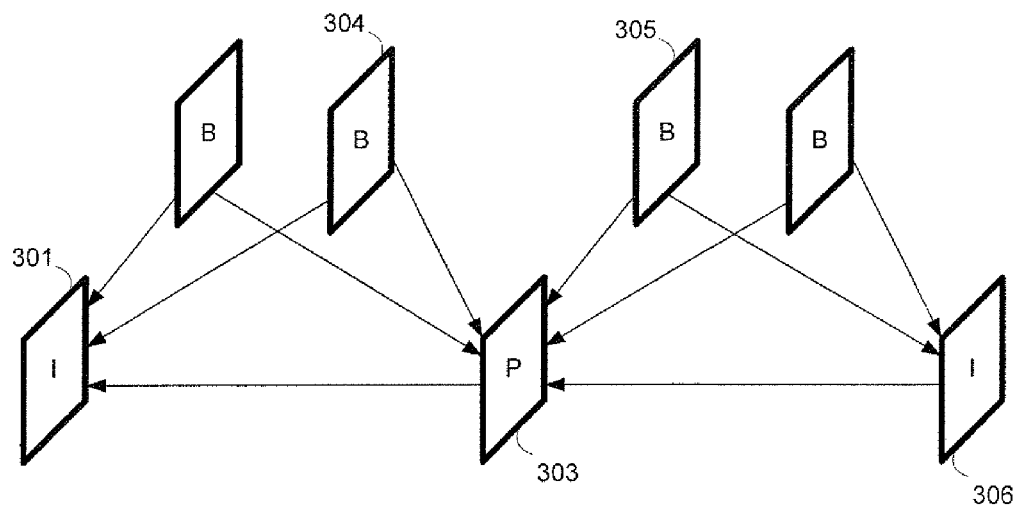
Transrate
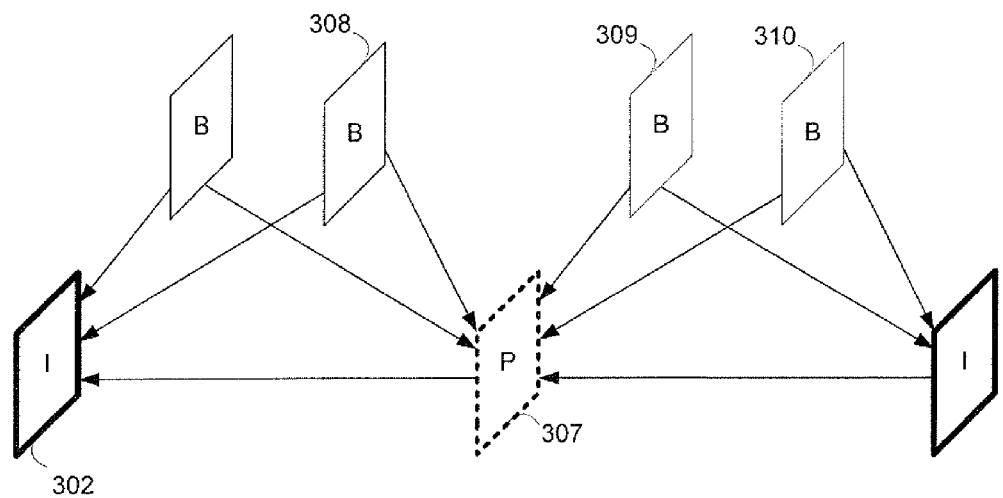

FIG. 5

| | Descriptor |
|---|---|
| coding_structure( payloadSize ) { | |
|   num_pictures_in_sop_minus1 | ue(v) |
|   num_sops_in_gop | ue(v) |
|   for( i = 0; i < num_pictures_in_sop_minus1; i++ ) { | |
|     primary_pic_type[ i ] | u(2) |
|     ref_flag[ i ] | u(1) |
|     temporal_num[ i ] | u(3) |
|     display_num[ i ] | ue(v) |
|   } | |
|   average_frame_rate_flag | u(1) |
|   average_bit_rate_flag | u(1) |
|   if( average_frame_rate_flag ) | |
|     average_frame_rate | u(16) |
|   if( average_bit_rate_flag ) | |
|     for( i = 0; i < NumTemporalLayers; i++ ) | |
|       averag_bit_rate[ i ] | u(16) |
| } | |

500

501 — coding_structure
502 — num_pictures_in_sop_minus1
503 — num_sops_in_gop
504 — primary_pic_type
505 — ref_flag
506 — temporal_num
507 — display_num
508 — average_frame_rate_flag
509 — average_bit_rate_flag
510 — if average_frame_rate_flag
511 — average_frame_rate
512 — if average_bit_rate_flag
513 — for loop
514 — averag_bit_rate

TECHNIQUES FOR DESCRIBING TEMPORAL CODING STRUCTURE

This application claims priority to U.S. Ser. No. 61/432,860, filed Jan. 14, 2011, titled "High Layer Syntax for Temporal Scalability," and to U.S. Ser. No 61/432,842, filed Jan. 14, 2011, titled "An SEI message for describing temporal picture coding structure", the disclosures of which are hereby incorporated by reference in its entirety.

FIELD

This application relates to video compression systems, and more particularly to syntax structures enabling decoders and Media-Aware Network Elements (MANES) to associate coded pictures with temporal layers, where an encoder generates a sequence of coded pictures in a fixed pattern of prediction relationships.

BACKGROUND

Commercial video compression techniques can use video coding standards to allow for cross-vendor interoperability. One such video coding standard is ITU-T Rec. H.264, "Advanced video coding for generic audiovisual services", March 2010, available from the International Telecommunication Union ("ITU"), Place de Nations, CH-1211 Geneva 20, Switzerland or http://www.itu.int/rec/T-REC-H.264, and incorporated herein by reference in its entirety.

H.264 allows for temporal scalability through a technique known as reference picture selection. Reference picture selection can allow, with a few limitations (such as: no references to pictures decoded before (in decoding order) the latest IDR picture), at the time of reconstruction of a given picture, inter picture prediction from any reference picture in storage at the decoder. The number of reference pictures stored in the decoder can be limited by profiles and levels of H.264. Further, the encoder during bitstream generation can explicitly signal, for each picture, whether it should be stored as a reference picture. In the absence of explicit signaling, some pictures are also stored implicitly. The combination of explicit signaling and implicit storage can allow for flexibility of reference picture management at low bitrate overhead.

In practice, however, certain H.264 encoders create bitstreams in which the referencing relationship of coded pictures, also known as temporal picture coding structures, do not exercise the full flexibility H.264 allows, but instead follow certain "patterns". One crude form of those patterns were known as Group Of Pictures, or GOPs, as known from, for example, ITU-T Rec. H.262 "Information technology—Generic coding of moving pictures and associated audio information: Video", February 2000, available from http://www.itu.int/rec/T-REC-H.262, which is also known as MPEG-2 video, and incorporated herein by reference. FIG. 1 shows such a pattern known as IBBP pattern, that is deployed in MPEG-2 and H.264 based broadcasting systems. A temporal base layer (101) includes Intra/IDR (I-) pictures (103) (104) and Predictively coded (P-) pictures (105). The I picture frequency—the inverse of the temporal distance between two I pictures such as pictures (103) and (104)—can be set by the encoder based on application demands (tune-in time for broadcast), and is often in the sub-second range. A temporal enhancement layer (102) can consist entirely of bi-predicted (B-) pictures (106) (107) with prediction relationships to the temporally closest I- or P-pictures. Prediction relationships are shown by arrows (108); the each arrow originates from a picture that is being predicted and points to the picture from which prediction information is taken.

According to MPEG-2, no multiple reference picture prediction mechanisms beyond the constrained mechanism of B frames were available, which limited the possible prediction relationships. In H.264, in contrast, prediction relationships can be more complex in two dimensions. First, inter picture prediction can be possible not only from the temporally closest or P picture (in case of a P picture that is predicting), or the two temporally closest, in the past or in the future, I or P pictures (in case of B pictures), but also from temporally distant pictures of any type. Second, while a given macroblock with a predicted (P-) or bi-predicted (B-) slice can reference only content of one or two different pictures for P or B coded macroblocks respectively, different macroblocks can reference different pictures even if they are located in the same slice.

FIG. 2 shows two patterns (201) (202) possible in H.264. Each of the two different patterns uses three different layers and each uses only I and P pictures.

The H.264/AVC JM reference software, as described in, for example, A. M. Tourapis, K. Sühring and G. Sullivan, "H.264/14496-10 AVC Reference Software Manual (revised for JM17.1)," JVT-AE010 revised, .IVT-Manual, London, UK, June, 2009, available from http://wftp3.itu.int/av-arch/jvt-site/2009_06_London/JVT-AE010.zip which is incorporated herein by reference, provides a mechanism for describing, in the encoder configuration file, the temporal picture coding structure for the encoder to generate. Many coding structures can be described using the "ExplicitHierachyFounat" parameter. The encoder uses these configuration parameters during its encoding, but does not explicitly encode the parameters inside, or along with the generated bitstream. A decoder, therefore, may not have a mechanism available to obtain the coding structure, without deriving it from the bitstream through deep bitstream inspection.

Sub-sequence information, sub-sequence layer characteristics, and sub-sequence characteristics SEI messages in the H.264/AVC standard provide some information about the coding structure, with fields to provide average frame rate and average bit rate for each sub-sequence layer. However, they do not have explicit notion of temporal layering and the coding/display order of each picture is not specified. Additionally, the SET messages have to be sent frequently for each picture or for each repeating structure.

The Scalability information SEI message in the H.264 SVC extension provides some means to describe the coding structure using layer_dependency_info_present_flag and associated syntactic elements, It also includes frame rate and bit rate information. However, the scalability information SEI message does not have enough information to fully identify temporal coding structures. For example, referring to FIG. 2, the scalable information SEI message cannot distinguish between the two coding structures depicted (201) (202).

As described, none of the aforementioned SEI messages, alone or in combination, describes a temporal coding structure fully in such a way that a decoder can use it for, for example, resource allocation purposes. Further, even if a Media-Aware Network Element such as a bitstream extractor or transrator were to intercept all SEI messages, it would not have all information available to meaningfully identify pictures (more precisely: NAL unit belonging to pictures) that can be removed from a scalable bitstream when pruning a scalable bitstream. Additional details regarding the bitstream extractor and transrator are described later.

A working draft of The High Efficiency Video Coding HEVC can be found at (B. Bross et. al., "WD4: Working Draft 4 of High-Efficiency Video Coding", available from http://wftp3.itu.int/av-arch/jctvc-site/2011_07_F_Torino/), referred to as "WD4" henceforth, which is incorporated herein by reference. HEVC inherits many high level syntax features of H.264. It can be advantageous to the success of HEVC if the potential shortcoming of H.264 described above were addressed before the standard is ratified.

A mechanism is therefore required that enables an encoder to place into a video bitstream a representation of a temporal coding picture structure or pattern, such that a decoder or a MANE can easily intercept and decode the representation and use it for, for example, transrating, or bitstream extraction in MANEs, or resource management in decoders.

SUMMARY

The disclosed subject matter describes a new pattern description, that can be part of an SEI message or a parameter set and can be used to describe a temporal picture coding structure. The knowledge of the coding structure can benefit transrators, bitstream extractors, and DVRs. Additionally, decoders can utilize the coding structure information to decode pictures in parallel, using multiple threads/cores.

BRIEF DESCRIPTION OF THE DRAWINGS

FIG. 2 presents two hierarchical P picture coding structures with three temporal layers each.

FIG. 3 presents the effect of an operation of a transrater on the picture of a temporal picture coding structure in accordance with an embodiment of the disclosed subject matter.

FIG. 5 presents a coding structure or pattern description syntax in accordance with an embodiment of the disclosed subject matter.

Figure 1:
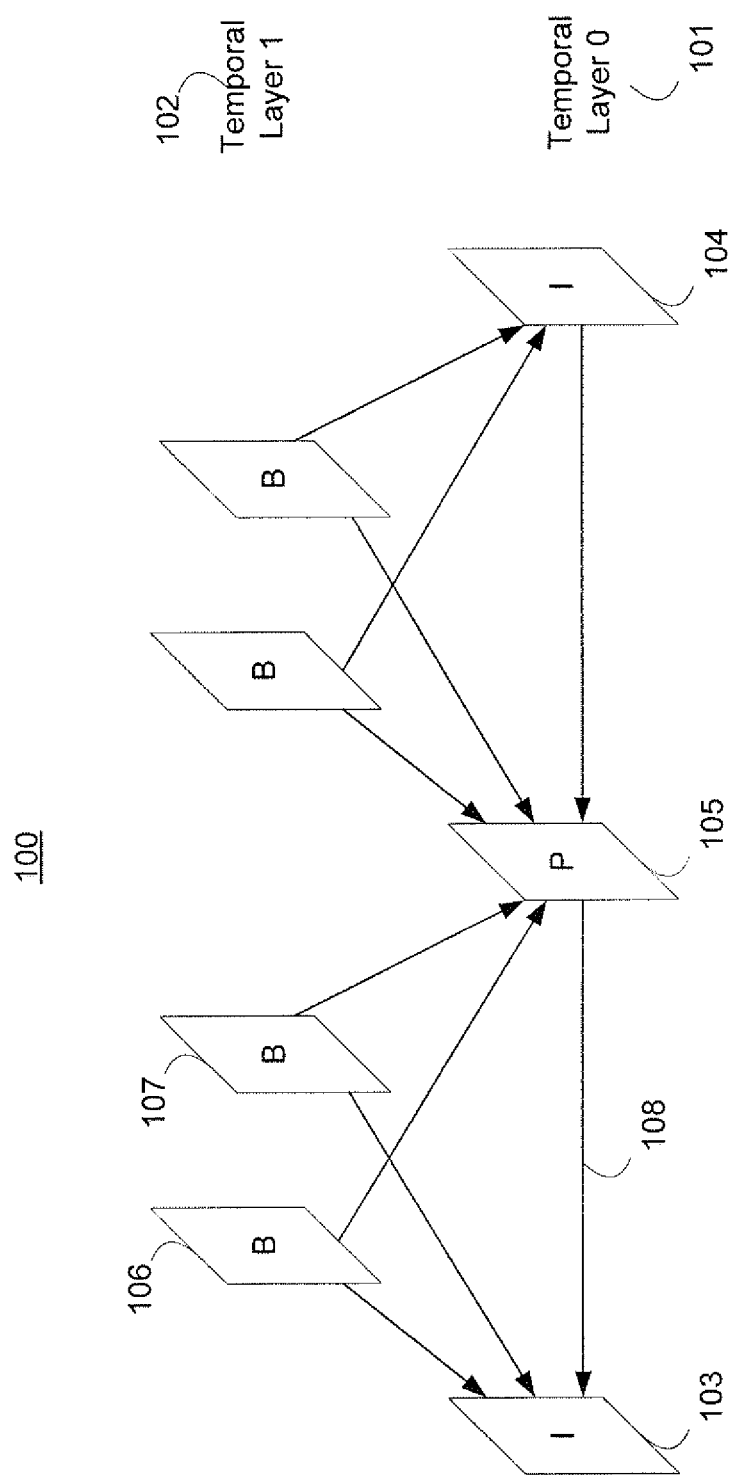
FIG. 1 presents a temporal picture coding structure known as IBBP.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

Detailed Description

FIG. 3 shows a video distribution system, for example a video conferencing system, using temporal scalable video coding technology in accordance with an embodiment of the disclosed subject matter. An encoder (201) can create a scalable bit stream (202) that can be sent to a MANE (203). The MANE (203) can manipulate the scalable bitstream. For example, the MANE can implement a bitstream extractor, that extracts from an incoming complex scalable bitstream (202) a less complex scalable bitstream (204) by removing entire layers, and/or it can implement a transrator which can modify pictures belonging to higher layers of the complex incoming scalable bitstream (202) without modifying pictures belonging to lower layers, so to decrease the bitrate of the outgoing scalable bitstream (204), without losing temporal resolution (frame rate). The MANE (203) can create an outgoing scalable or non-scalable bitstream (204), that can be consumed by a decoder (205).

FIG. 3 also shows an example of an operation a transrator may perform.

Incoming to the transrator, in this example, are pictures according to an IBBP pattern as already described. The pictures are shown as bold lines, indicating that they have a certain high number of bits. The absolute number of bits is not particularly relevant; what matters is the number of bits per picture before and after transrating. The transrator's task is to reduce the bitrate of the bitstream without reducing the temporal resolution (which can translate into removal of whole coded pictures). As the bitrate available to the outgoing port of a transrator may improve at any time, also the transrator should not reduce the bitrate of those pictures used for prediction by more than the amount required by the application. On the other hand, the size of pictures not used for reference can be reduced potentially more significantly. Some pictures are used to predict fewer than other pictures, and there bitrate can be reduced somewhat, based, for example, on the number of prediction relationships they carry.

Accordingly, the transrator can leave the bitrate of the I pictures unchanged, as indicated by bold lines representing pre-transrated picture (301) and post-transrated picture (302) in the same position in the pattern. The P picture (303) is used to predict the B pictures (such as (304) and (305), but is not used, neither directly nor indirectly, to predict the I picture (306) following the P picture (303) on the lower temporal layer. Accordingly, the transrator can reduce the bitrate for P picture (303) somewhat, as indicated by boldface, punctuated lines in the transrated P picture (307). The B pictures (304), (305) are not used for referenced by any other pictures, and, therefore, their bitrate can be cut significantly, as indicated by dotted lines (308) (309).

In order to identify a pictures which can be transrated to a lower rate, and to what extent that lowering of a rate is advisable, a transrator should know how prominently the picture is being used a reference picture by other pictures in a pattern. By knowing its position in a pattern, such knowledge can be established. In order to determine the position of a picture in the pattern, the nature of the pattern needs to be known by the transrator. Once known, a state machine can be used to determine the position of a picture in the pattern, based on, for example, the picture type, the temporal reference or frame_num or equivalent information, and so forth.

Figure 4:
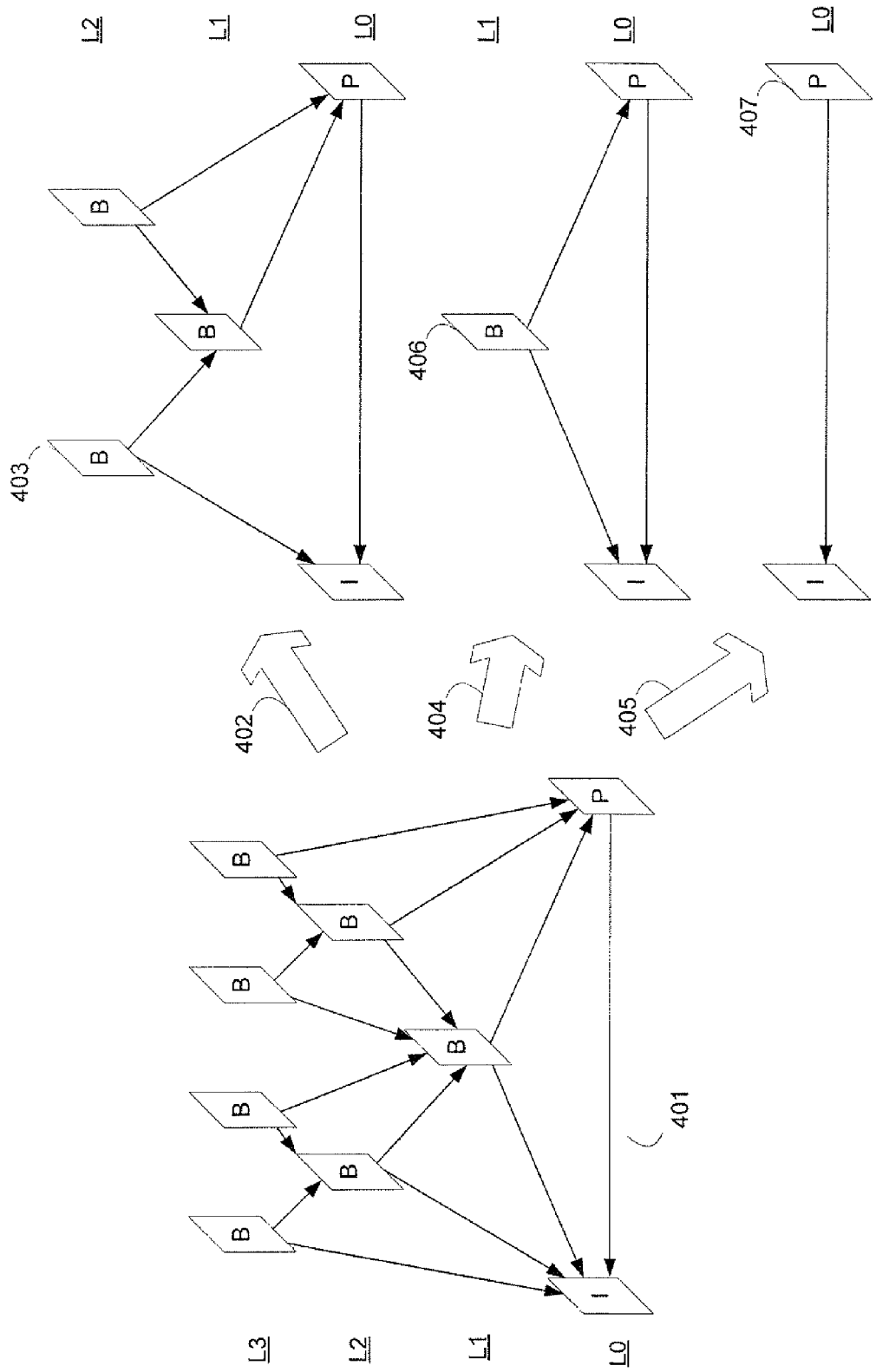
FIG. 4 presents the effect of an operation of a three different bitstream extractor operations on a temporal picture coding structure in accordance with an embodiment of the disclosed subject matter.

FIG. 4 shows an example of an operation a bitstream extractor may perform in accordance with an embodiment of the disclosed subject matter.

A bitstream extractor can be viewed as a transrator that transrates certain pictures to zero bits, i.e. removes certain pictures from a scalable bitstream. In this example, a further simplified bitstream extractor removes all pictures of a given temporal layer.

A complex pre-extracted pattern (401) uses four layers, L0 through L3. Three different extraction modes are shown, extracting one, two, or three layers, respectively. Mode 1 (402) extracts only the highest layer L3, leaving a three temporal layer pattern (403). Mode 2 and mode 3, extract (404) (405) two or three layers, respectively, leaving a two or single layer scalable bitstream (406) (407).

As it was the case for the transrator, also the bitstream extractor needs to identify pictures it can/must remove in order to extract only certain temporal layers from a bitstream. As it was the case with the transrator, a combination of easily parsable or derivable syntax elements such as picture type and frame_num or temporal reference, in conjunction with a state machine, and information describing the pattern greatly facilitate an implementation of a bitstream extractor.

A MANE can include a bitstream extractor, a transrate, or both. The disclosed subject matter allows a MANE or a decoder to remove or transrate pictures belonging to layers, by providing them with easily obtainable information about the pattern in use (in contrast to information obtainable only through deep bitstream inspection over a long time). Described now is the content of this information, followed by a description of the options for encoding the information.

Another application example can be a Digital Video Recorder (DVR), implementing a "fast forward" function. A DVR that has stored a scalable bitstream 401, can, for example, extract (402) the bitstream (403), to play back at twice the original rate, or extract (404) bitstream (406) to play back four times as fast, and extract (405) bitstream (407) to play back eight times as fast. As a result, the knowledge of a pattern, in conjunction with a scalable bitstream, can facilitate fast forward in a DVR. This is an example where knowledge of a pattern is helpful inside, or at least co-located, with a decoder, in contrast to a normally not co-located MANE.

In some cases, advanced knowledge of a pattern can also facilitate parallel decoding techniques. Referring to FIG. 3, if it is known that the coding structure is as shown, then decoding of, for example, pictures (309) and (310) can be performed in parallel, as the two pictures do not have any dependencies to each other.

In order to establish knowledge of a pattern, the mechanism now described can be used.

With reference to FIG. 5, described is now a syntax structure (500) and associated semantics of a patter description that enables aforementioned applications in accordance with an embodiment of the disclosed subject matter.

In this disclosure, syntax table diagrams following the conventions specified in H.264 are used. To briefly summarize those conventions, a C-style notation is used. A boldface character string refers to a syntax element fetched from the bitstream (which can consist of NAL units separated by, for example, start codes or packet headers). The "Descriptor" column of the syntax diagram table provides information of the type of data. For example, u(2) refers to an unsigned integer of 2 bits length, f(1) refers to a single bit of a predefined value, and ue(v) refers to a variable length, for example Golob-Rice coded, codeword, to be interpreted after entropy decoding as an unsigned integer.

An encoder can generate coded pictures that can be ordered into one or more Group of Pictures (GOPs). A GOP is defined as a group of ordered (in decoding order) coded pictures that start with an I/IDR picture (depending on the video coding standard) and ends with a picture immediately preceding the next I/IDR picture. In MPEG-2, a GOP is known under this name; in H.264, a GOP is known as a "sequence".

In one an embodiment, a GOP can contain pictures ordered according to a single fixed pattern, henceforth "Structure of pictures" (SOP) that may repeat so to populate the GOP. In FIG. 1, shown is one GOP that includes two SOPs; the first SOP starting with picture (103) and ending with picture (107), and the second starting with picture (105).

In the same or another embodiment, a pattern description can contain a syntax element num_pictures_in_sop_minus_1 (501), which can be variable length coded and can represent the number of pictures in a pattern. Briefly referring to FIG. 1, there are three pictures between picture (103) (inclusive) and picture (105) (exclusive) that form the pattern, and, therefore, the value of num_pictures_in_sop_minus_1 would be 2. In the case where the number of pictures in the GOP is unknown (for example for all-intra, or IPPP coding structures, the latter referring to a bitstream that starts with an I picture and is followed only by predictively coded pictures), the value of num_pictures __ in__ SOP minus 1 can be 0 indicating such a situation, which can have the side effect that no further pattern description is included, as described below.

In the same or another embodiment, the pattern description can include a syntax element num_sops_in_gop (502), indicating the number of SOPs repeated in a GOP. With reference to FIG. 1, the value of num_sops_in_gop would be 2, as there are two patterns in the GOP as already described. In the case of all intra coding, this value can be 1. num_sops_in_gop equal to 0 specifies that there is no specific GOP structure and that the next expected I picture is unknown, or that the coded video sequence consists of just one GOP.

In the same or another embodiment, for each picture but the first picture in the SOP (503), the description can include the following syntax elements:

primary_pic_type (504) indicates the type of the picture, such as IDR, Intra, P, or B. The mapping of values of this syntax element advantageously follows the mappings defined elsewhere in the video coding standard in question. For example, in H.264, the primary_pic_type of an IDR picture is 0.

ref_flag (505) equal to 1 can specify that the coded picture is a reference picture. ref_flag equal to 0 can specify that the coded picture is not a reference picture. A reference picture is a picture that is referenced by at least one other picture. Referring to FIG. 1, a reference picture is the "target" of at least one arrow.

temporal_num (506) can specify the temporal_id value (the temporal layer number) associated with the coded picture. Referring to FIG. 4, temporal_num would be 0 for L0, 1 for L1, 2 for L2, and 3 for L3.

display_num (507) can specify the display order of the coded picture within the SOP. Except for the very first picture in the SOP, each picture in the GOP is described in the coding order, which may be different from the display order. This unique number specifies the display number of the coded picture within the SOP.

The following default values can apply to the first picture in the SOP (for which, as described above, no values are encoded):

Primary_pic_type (504) can be inferred to the value corresponding to an IDR or I picture. Ref_flag (505) can be inferred to 1. Temporal_num (506) can be inferred to 0. Display_num (507) can be derived from the display_num (507) values used in the other pictures in the SOP. In some cases, for example cases that use GOP structures like the one in FIG. 1, display_num (507) can be 0, indicating that the I/IDR picture is the first picture to be displayed. However, if any of the other pictures uses display_num=0 (indicating that this picture is the first picture in the SOP to be displayed), one can search for a missing display_num (507), i.e. a value of display_num (507) that is lower than num_pictures-in_SOP_minus_1 (501) and not coded in any display_num (507) field in the SOP description.

In the same or another embodiment, the description can include information pertaining to the average bitrates and frame rates of the pictures in the SOP, for example as follows:

An average_frame_rate_flag (508) can specify whether the average frame rate is included. Similarly, an average_bit_rate_flag (509 can) specify whether the average bit rate is specified.

average_frame_rate (511) is only present (510) average_frame_rate_flag (508) is 1, and can specify the average frame rate, for example in units of frames per 256 seconds of the entire coded sequence. Using this information and the temporal_num information gathered for each coded picture in the SOP, the frame rate of each temporal layer can be derived.

average_bit_rate (514) information can be available for each temporal layer (513), and if the average_frame_bit_flag (509) is set to 1. Average_bit_rate (514) can indicate the average bit rate in units of 1000 bits per second of the temporal layer i. All NAL units of the temporal layer, including all NAL units of the temporal layer j, where j<i, are taken into account in the calculation.

The above description can be placed in a coded bitstream, for example, at the following exemplary locations.

In the same or another embodiment, the pattern description can be included in an SEI message. The video coding standard can advantageously contain a restriction that the SEI message can only be placed in or before a picture that can start a GOP, for example the first intra or IDR picture. The SEI message can apply, for example, only to the pictures forming the GOP. Placing the pattern description in an SEI has, for example, the advantage of allowing for pattern changes without requiring a different parameter set reference. Further, an SEI message can be ignored by those decoders which do not implement their decoding and/or do not require the information available in the pattern description, for example because they are not operating in real-time and, therefore, have time for deep bitstream inspection.

In the same or another embodiment, the pattern description can be part of a parameter set, for example part of the Visual Usability Information of the sequence parameter set. Placing the parameters in parameter set can have implementation advantages for certain MANEs, as they may need to decode and interpret parameter sets anyway, whereas they may not need to concern themselves with SEI messages.

An encoder that operates with GOP structures and fixed patterns can easily generate, and include in a scalable bitstream, SEI messages and/or parameter sets containing a pattern description. It can, for example, select a coding structure that is appropriate for the application. For example, some video broadcasting encoder are known to employ a coding structure (100) as shown in FIG. 1, and some video conferencing systems are known to employ a hierarchical coding structure (201) as shown in FIG. 2. With the coding structure selected, the encoder can place into the bitstream, as already described, the pattern description. In some cases, for example in case of highly variable multicast receiver population and/or highly fluctuating bandwidth, an encoder can also create a new coding structure while encoding, and include this new coding structure into a bitstream, following the constraints already described.

A MANE or decoder can intercept the SEI message or parameter set carrying the pattern description, and can use the values contained therein, after entropy decoding, as described earlier, for example to identify pictures to transrate or to remove from the bitstream or to decode in parallel.

The methods for video encoding, video decoding, and MANE operation, described above, can be implemented as computer software using computer-readable instructions and physically stored in computer-readable medium. The computer software can be encoded using any suitable computer languages. The software instructions can be executed on various types of computers. For example, FIG. 6 illustrates a computer system 600 suitable for implementing embodiments of the present disclosure.

Figure 6:
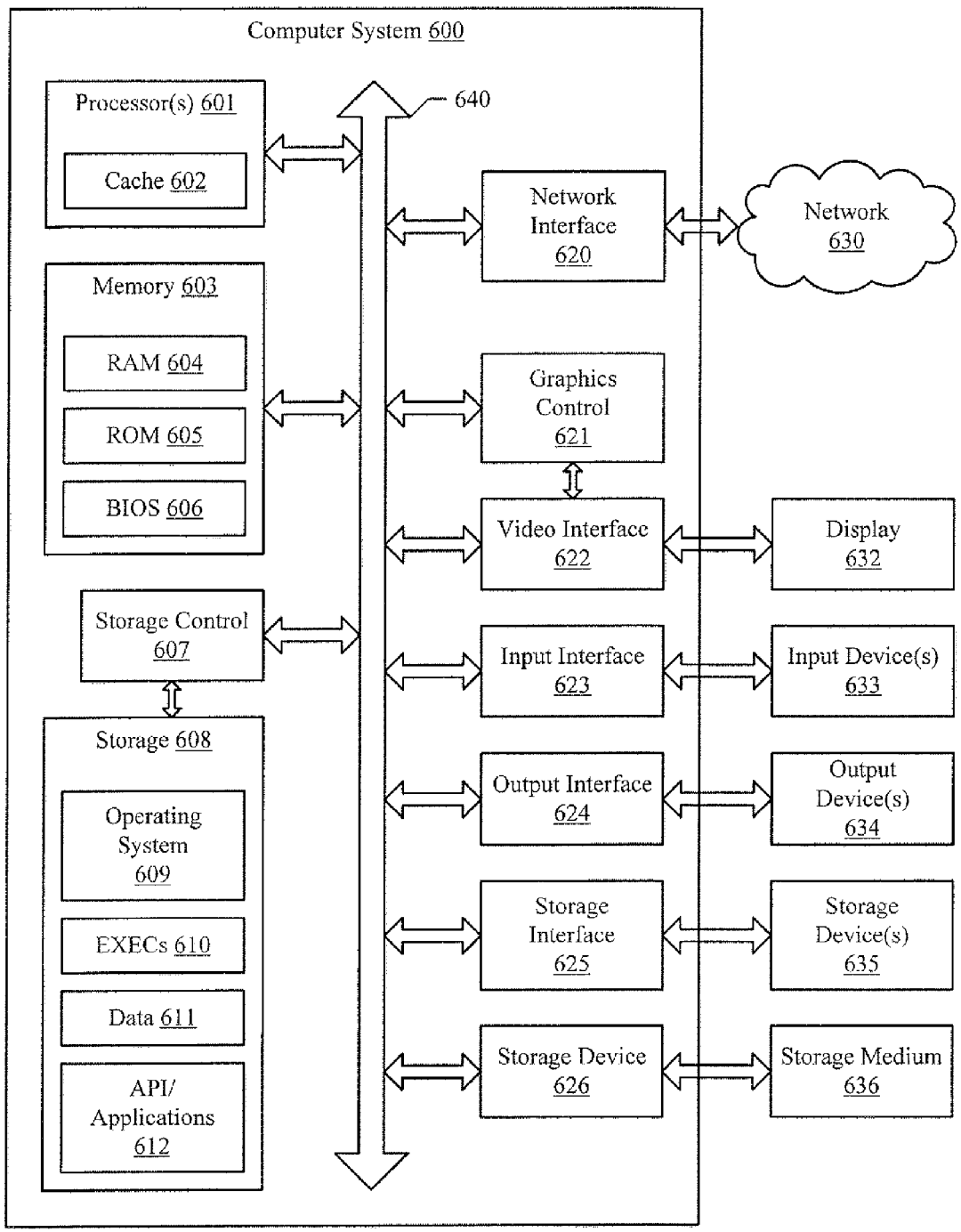
FIG. 6 shows a computer system for video coding in accordance with an embodiment of the disclosed subject matter.

The components shown in FIG. 6 for computer system 600 are exemplary in nature and not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 600 can have many physical forms including an integrated circuit, a printed circuit board, a small handheld device (such as a mobile telephone or PDA), a personal computer or a super computer.

Computer system 600 includes a display 632, one or more input devices 633 (e.g., keypad, keyboard, mouse, stylus, etc.), one or more output devices 634 (e.g., speaker), one or more storage devices 635, various types of storage medium 636.

The system bus 640 link a wide variety of subsystems. As understood by those skilled in the art, a "bus" refers to a plurality of digital signal lines serving a common function. The system bus 640 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally contain a cache memory unit 602 for temporary local storage of instructions, data, or computer addresses. Processor(s) 601 are coupled to storage devices including memory 603. Memory 603 includes random access memory (RAM) 604 and read-only memory (ROM) 605. As is well known in the art, ROM 605 acts to transfer data and instructions uni-directionally to the processor(s) 601, and RAM 604 is used typically to transfer data and instructions in a bi-directional manner. Both of these types of memories can include any suitable of the computer-readable media described below.

A fixed storage 608 is also coupled bi-directionally to the processor(s) 601, optionally via a storage control unit 607. It provides additional data storage capacity and can also include any of the computer-readable media described below. Storage 608 can be used to store operating system 609, EXECs 610, application programs 612, data 611 and the like and is typically a secondary storage medium (such as a hard disk) that is slower than primary storage. It should be appreciated that the information retained within storage 608, can, in appropriate cases, be incorporated in standard fashion as virtual memory in memory 603.

Processor(s) 601 is also coupled to a variety of interfaces such as graphics control 621, video interface 622, input interface 623, output interface 624, storage interface 625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it is contemplated that the CPU 601 might receive information from the network 630, or might output information to the network in the course of performing the above-described method. Furthermore, method embodiments of the present disclosure can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor(s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

We claim:

1. A method for video coding in an encoder, comprising:
   determining a coding structure comprising, for each of num_pictures_in_sop_minus_1+1 coded pictures, a picture type (primary_pic_type), and a value indicative of a temporal layer of the picture (temporal_num), num_pictures_in_sop_minus$_1$ having a value larger than 0;
   encoding, in a Supplementary Enhancement Information (SEI) message, a value indicative of a number of pictures in a pattern (num_pictures_in_sop_minus_1 );
   encoding, in the SEI message, a pattern description indicative of at least a prediction structure of a plurality of coded pictures, the pattern description comprising a table of num_pictures_in_sop_minus_1+1 entries representing the coding structure, each entry comprising the picture type (primary_pic_type) and the value indicative of a temporal layer (temporal_num) of a picture represented by the table entry, the table including at least a first entry and a second entry, the first entry associated with a picture picA and including a value primary_pic_type_A and a value temporal_num_A, the second entry associated with a picture picB and including a value primary_pic_type_B and a value temporal_num_B, primary_pic_type_A being different from primary_pic_type_B, picB can depend on picA only when temporal_num_A is less than or equal to temporal_num_B,
   encoding the SEI messages into a coded video bitstream complying with HEVC; and
   encoding at least one set of pictures according to the coding structure into the coded video bistream, the set of pictures including at least one first coded picture of a first picture type other than Independent Decoder Refresh (IDR) picture.

2. The method of claim 1, the pattern description further including at least one of:
   a number of patterns between two IDR/I pictures (num_sop_in_gop);
   a flag indicating a coded picture is used as a reference picture (ref_flag);
   a value indicative of a display order for a picture (display_num);
   a value indicative of an average frame rate (average_frame_rate); and
   a value indicative of an average bit rate (average_bit_trate).

3. A method of operation comprising:
   at an encoder,
      determining a coding structure comprising, for each of num_pictures_in_sop_minus_1+1 coded pictures, a picture type (primary_pic_type), and a value indicative of a temporal layer of the picture (temporal_num) num_pictures_in_sop_minus$_1$ having a value larger than 0;
      encoding, in a Supplementary Enhancement Information (SEI) message, a value indicative of a number of pictures in a pattern (num_pictures_in_sop_minus_1);

encoding, in the SEI message, a pattern description indicative of at least a prediction structure of a plurality of coded pictures, the pattern description comprising a table of num_pictures_in_sop_minus_1+1 entries representing the coding structure, each entry comprising the picture type (primary_pic_type) and the value indicative of a temporal layer (temporal_num) of a picture represented by the table entry, the table including at least a first entry and a second entry, the first entry associated with a picture picA and including a value primary_pic_type_A and a value temporal_num_A, the second entry associated with a picture picB and including a value primary_pic_type_B and a value temporal_num_B, primary_pic_type_A being different from primary_pic_type_B, picB can depend on picA only when temporal_num_A is less than or equal to temporal_num_B, encoding the SEI message into a coded video bitstream complying with HEVC, and encoding at least one set of pictures according to the coding structure into the coded video bistream, the set of pictures including at least one first coded picture of a first picture type other than Independent Decoder Refresh (IDR) picture; and at a Media Aware Network Element connected to the encoder over a network, intercepting and decoding the pattern description.

4. The method of claim 3, further comprising:
receiving at least one picture, and
based on the received and decoding pattern description, at least one of: discarding and transrating the picture.

5. A method for video decoding in a decoder comprising:
decoding, from a coded video bitstream complying with HEVC, a first coded picture of a first picture type other than Independent Decoder Refresh (IDR) picture, the first coded picture including a Supplementary Enhancement Information (SEI) message comprising a pattern description indicative of at least a prediction structure of a plurality of coded pictures including the first coded picture, the pattern description comprising:
　at least one value num_pictures_in_sop_minus_1 indicative of the number of coded pictures represented in the pattern description, num_pictures_in_sop_minus_1 having a value larger than 0 , and
　a table of num_pictures_in_sop_minus_1+1 entries, each entry comprising a picture type (primary_pic_type), and a value indicative of a temporal layer (temporal_num) of a picture represented by the table entry, the table including at least a first entry and a second entry, the first entry associated with a picture picA and including a value primary_pic_type_A and a value temporal_num_A, the second entry associated with a picB and including a value primary_pic_type_B and a value temporal_num_B, primary_pic_type_A being different from primary_pic_type_B, picB can depend on picA only when temporal_num_A is less than or equal to temporal_num_B; and decoding at least one n-th picture, where n is between 1 and num_pictures_in_sop_minus_1, the n-th picture being n−1 pictures in the future of the first picture, and the n-th picture having a primary picture type and a temporal layer the same as the values primary_pic_type and temporal_num, respectively, in the n-th entry of the table.

6. The method of claim 5, further comprising:
decoding in parallel at least two of the num_pictures_in_sop_minus_1 pictures based on independency of the two pictures, the independency of the two coded pictures being derived from the decoded pattern description, and the two coded pictures being predictively coded.

7. A method for video coding in an encoder, comprising:
determining a coding structure comprising, for each of num_pictures_in_sop_minus_1+1 coded pictures, a picture type (primary_pic_type), and a value indicative of a temporal layer of the picture (temporal_num) num_pictures_in_sop_minus_1 having a value larger than 0;

encoding, in a parameter set, a value indicative of a number of pictures in a pattern (num_pictures_in_sop_minus_1);

encoding, in the parameter set, a pattern description indicative of at least a prediction structure of plurality of coded pictures, the pattern description comprising a table of num_pictures_in_sop_minus_1+1 entries representing the coding structure, each entry comprising the picture type (primary_pic_type) and the value indicative of a temporal layer (temporal_num) of a picture represented by the table entry, the table including at least a first entry and a second entry, the first entry associated with a picture picA and including a value primary_pic_type_A and a value temporal_num_A, the second entry associated with a picture picB and including a value primary_pic_type_B and a value temporal_num_B, primary_pic_type_A being different from primary_pic_type_B, picB can depend on picA only when temporal_num_A is less than or equal to temporal_num_B, encoding the SEI message into a coded video bitstream complying with HEVC, and encoding at least one set of pictures according to the coding structure, into the coded video bistream, the set of pictures including at least one first coded picture of a first picture type other than Independent Decoder Refresh (IDR) picture.

8. The method of claim 7, the pattern description further including at least one of:
　a number of patterns between two IDR/I pictures (num_sop_in_gop);
　a flag indicating a coded picture is used as a reference picture (ref_flag);
　a value indicative of a display order for a picture (display_num);
　a value indicative of an average frame rate (average_frame_rate); and
　a value indicative of an average bit rate (average_bit_trate).

9. A method of operation comprising:
at an encoder,
　determining a coding structure comprising, for each of num_pictures_in_sop_minus_1+1 coded pictures, a picture type (primary_pic_type), and a value indicative of a temporal layer of the picture (temporal_num) num_pictures_in_sop_minus_1 having a value larger than 0;
　encoding, in a parameter set, a value indicative of a number of pictures in a pattern (num_pictures_in_sop_minus_1);
　encoding, in the parameter set, a pattern description indicative of at least a prediction structure of a plurality of coded pictures, the pattern description comprising a table of num_pictures_in_sop_minus_1+1 entries representing the coding structure, each entry comprising the picture type (primary_pic_type) and the value indicative of a temporal layer (temporal_num) of a picture represented by the table entry, the table including at least a first entry and a second entry, the first entry associated with a picture picA and including a value primary_pic_type_A and a value temporal_num_A, the second entry associated with a picture picB and including a value primary_pic_type_B and a value temporal_num_B, primary_pic_type_A being different from primary_pic_type_B, picB can depend on picA only when temporal_num_A is less than or equal to temporal_num_B, encoding the SEI message into a coded video bitstream complying with HEVC, and encoding at least one set of pictures according to the coding structure into the coded video bistream, set of pictures including at least one first coded picture of a first picture type other than Independent Decoder Refresh (IDR) picture; and at a Media Aware Network Element connected to the encoder over a network, intercepting and decoding the pattern description.

10. The method of claim 9, further comprising:

receiving at least one picture, and based on the received and decoding pattern description, at least one of: discarding and transrating the picture.

11. A method for video decoding in a decoder comprising:

decoding, from a coded video bitstream complying with HEVC, a first coded picture of a first picture type other than Independent Decoder Refresh (IDR) picture, the first coded picture including a Supplementary Enhancement Information (SEI) message comprising a pattern description indicative of at least a prediction structure of a plurality of coded pictures including the first coded picture, the pattern description comprising:

at least one value num_pictures_in_sop_minus_1 indicative of the number of coded pictures represented in the pattern description, num_pictures_in_sop_minus_1 having a value larger than 0, and a table of num_pictures_in_sop_minus_1+1 entries each entry comprising a picture type (primary_pic_type), and a value indicative of a temporal layer (temporal_num) of a picture represented by the table entry, the table including at least a first entry and a second entry, the first entry associated with a picture picA and including a value primary_pic_type_A and a value temporal_num_A, the second entry associated with a picture picB and including a value primary_pic_type_B and a value temporal_num_B, primary_pic_type_A being different from primary_pic_type_B, picB can depend on picA only when temporal_num_A is less than or equal to temporal_num_B; and decoding at least one n-th picture, where n is between 1 and num_pictures_in_sop_minus_1, the n-th picture being n−1 pictures in the future of the first picture, and the n-th picture having a primary picture type and a temporal layer of the n-th decoded coded picture is the same as the values primary_pic_type and temporal_num, respectively, in the n-th entry of the table.

12. The method of claim 11, further comprising:

decoding in parallel at least two of the num_pictures_in_sop_minus_1 pictures based on independency of the two pictures, the independency of the two coded pictures being derived from the decoded pattern description.

13. A non-transitory computer readable medium comprising executable instructions to direct a processor to perform the methods of one of claims 1, 2, 3, 4, 5, 6, or 7-12.

* * * * *